United States Patent
Itoh

(10) Patent No.: US 6,636,717 B2
(45) Date of Patent: Oct. 21, 2003

(54) DEVELOPING DEVICE INCLUDING FIRST AND SECOND DEVELOPER CARRYING DEVICES WITH INSUFFICIENTLY-CHARGED DEVELOPER CONTROL FEATURE

(75) Inventor: Isami Itoh, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/976,099

(22) Filed: Oct. 15, 2001

(65) Prior Publication Data

US 2002/0044797 A1 Apr. 18, 2002

(30) Foreign Application Priority Data

Oct. 17, 2000 (JP) .......................... 2000-317015

(51) Int. Cl.$^7$ .............................................. G03G 15/09
(52) U.S. Cl. ........................................ 399/269; 399/274
(58) Field of Search ................................. 399/267, 269, 399/272, 274, 277

(56) References Cited

U.S. PATENT DOCUMENTS

| | | | |
|---|---|---|---|
| 2,297,691 A | | 10/1942 | Carlson |
| 3,909,258 A | | 9/1975 | Kotz |
| 4,015,561 A | * | 4/1977 | Howard et al. ............. 399/269 |
| 4,048,957 A | * | 9/1977 | Tagawa ..................... 399/269 |
| 4,177,757 A | * | 12/1979 | Murakawa et al. ......... 399/269 |
| 4,356,245 A | | 10/1982 | Hosono et al. ............. 430/122 |
| 4,370,056 A | * | 1/1983 | Hays ......................... 399/269 |
| 4,679,527 A | * | 7/1987 | Chang ........................ 399/269 |
| 4,833,504 A | * | 5/1989 | Parker et al. ........... 399/269 X |
| 4,912,511 A | * | 3/1990 | Murasaki ................... 399/269 |
| 5,416,571 A | * | 5/1995 | Yamada et al. ............ 399/269 |
| 5,545,840 A | * | 8/1996 | Doi et al. .................. 399/274 |
| 6,397,031 B1 | * | 5/2002 | Itoh ........................... 399/269 |

FOREIGN PATENT DOCUMENTS

| | | |
|---|---|---|
| JP | 42-23910 | 11/1942 |
| JP | 43-24748 | 10/1943 |
| JP | 52-94140 | 8/1977 |
| JP | 54-43036 | 4/1979 |

OTHER PUBLICATIONS

U.S. patent application Ser. No. 09/648,736, filed Aug. 28, 2000, pending.

* cited by examiner

Primary Examiner—Sandra Brase
(74) Attorney, Agent, or Firm—Fitzpatrick, Cella, Harper & Scinto

(57) ABSTRACT

A developing device includes rotatable first and second developer carrying members carrying developer thereon to develop an electrostatic image formed on an image bearing member. The first and second developer carrying members are provided with a plurality of nonrotary magnetic poles therein, respectively a developer regulating member regulates the amount of the developer carried on the second developer carrying member. The positions of the plurality of magnetic poles of the first and second developer carrying members are set so that either a magnetic line of force extending from the surface of the second developer carrying member to the surface of the first developer carrying member or a magnetic pole may not exist at a position whereat the first and second developer carrying members are opposed to each other in an area formed between the tangent connecting the center of rotation of the second developer carrying member to the surface of the first developer carrying member on the side of the image bearing member and a line connecting the centers of rotation of the first and second developer carrying members.

21 Claims, 4 Drawing Sheets

DEVELOPING DEVICE INCLUDING FIRST AND SECOND DEVELOPER CARRYING DEVICES WITH INSUFFICIENTLY-CHARGED DEVELOPER CONTROL FEATURE

BACKGROUND OF THE INVENTION

1. Field of the Invention

This invention relates to a developing device for developing an electrostatic image formed on an image bearing member with a developer, and the developing device is preferably used in an image forming apparatus of the electrophotographic type, the electrostatic recording type or like type.

2. Description of the Related Art

As the electrophotographic method, there are known a number of methods as described in U.S. Pat. No. 2,297,691, Japanese Patent Publication (Koukoku) No. 42-23910 and Japanese Patent Publication (Koukoku) No. 43-24748, and generally, by the utilization of a photoconductive material and by various means, an electrical latent image is formed on the surface of a photosensitive member which is a latent image bearing member, and then the latent image is visualized as a toner image by the use of a toner which is a developer, and as required, the toner image is transferred to a transfer material which is a recording medium such as paper, whereafter the transfer material is subjected to the fixing process by heating or solvent vapor or the like to thereby obtain a copy.

There are also known various methods of visualizing an electrical latent image by the use of a toner, and as developing methods, there are known a number of developing methods such as a magnetic brush developing method, a powder cloud method, a fur brush developing method and a liquid developing method.

In these developing methods, particularly magnetic brush development, cascade development, liquid development, etc. using a developer consisting chiefly of a toner and a carrier are widely put into practical use. Any of these methods is an excellent method which can obtain good images relatively stably, while on the other hand, they have common disadvantages peculiar to a two-component developer such as the deterioration of the carrier and the fluctuation of the mixing ratio of the toner and the carrier.

In order to avoid such disadvantages, various developing methods using a mono-component developer consisting of only a toner (hereinafter referred to as the mono-component developing method) have been proposed. For example, in U.S. Pat. No. 3,909,258, there is proposed a method of developing by the use of a magnetic toner having electrical conductivity. This is to cause a sleeve which is a cylindrical and electrically conductive developer carrying member having magnetism therein to carry a magnetic toner thereon, and bring the magnetic toner into contact with an electrostatic latent image which is a latent image on a latent image bearing member to thereby develop the latent image. At this time, in a developing area which is a portion in which the latent image bearing member and the sleeve are opposed to each other, an electrically conducting path is formed between the surface of the latent image bearing member and the surface of the sleeve by toner particles, and charges are directed from the sleeve to the toner particles via this electrically conducting path, and the toner particles adhere to the electrostatic latent image by the Coulomb's force between the sleeve and the electrostatic latent image on the latent image bearing member, whereby the electrostatic latent image is developed. This developing method using the magnetic toner having electrical conductivity is an excellent method avoiding the problems peculiar to the conventional two-component developing method, while on the other hand, it has the disadvantage that since the toner is electrically conductive, it is difficult to finally electrostatically transfer the toner image from the latent image bearing member to a recording medium such as plain paper after the electrostatic latent image has been visualized as a toner image.

In order to solve this problem, as a developing method using a high-resistance toner capable of electrostatically transferring a toner image from a latent image bearing member to a recording medium, Japanese Patent Application Laid-Open No. 52-94140 shows a developing method utilizing the dielectric polarization of toner particles. Such a method, however, has the disadvantages that essentially the developing speed is low and the density of the toner image by development is not sufficiently obtained, and has been difficult in practical use. As another method using a high-resistance magnetic toner, there is known a method in which toner particles are triboelectrically charged by the friction between toner particles and the friction between the toner particles and a sleeve, and the toner particles are brought into contact with a latent image bearing member to thereby develop a latent image on the latent image bearing member. These methods, however, have the disadvantage that the frequency of the contact between the toner particles and the sleeve or the like is small and triboelectric charging is liable to become insufficient, or when the Coulomb's force between the toner particles and the sleeve is strong, the toner particles are liable to cohere on the sleeve, and it is pointed out that these methods have many difficulties in practical use.

In contrast, in Japanese Patent Application Laid-Open No. 54-43036, there is proposed a novel developing method which has eliminated the above-noted disadvantage. This is to apply a toner very thinly onto a sleeve, and triboelectrically charge the toner, and then make the toner very proximate to an electrostatic latent image under the action of a magnetic field and oppose the toner to the electrostatic latent image without bringing the toner into contact with the electrostatic latent image, and develop the electrostatic latent image.

According to the method, it is made possible to adopt a construction of applying a magnetic toner very thinly onto the sleeve to thereby increase the frequency of contact between the magnetic toner and the sleeve, and induce in the toner a triboelectric charge amount necessary to be used for development.

According to our investigation of the imparting of charges to the toner in the mono-component developing process, it has been found that the behavior of the toner in the charge-imparted portion is as follows.

FIG. 4 of the accompanying drawings shows an example of a developing device using the magnetic toner.

Such a developing device, as shown in FIG. 4, is provided with a developing sleeve 101 which is a developer carrying member disposed for rotation in the direction of arrow and using a nonmagnetic member, a permanent magnet 101*b* fixed to the interior of the developing sleeve 101, a magnetic blade 202 which is developer regulating means using a magnetic member, a developing container 103 for containing a magnetic toner therein, and a conveying member 104.

The magnetic blade 202 is disposed so that the distance thereof to the developing sleeve 101 may be a constant value W. Generally, it is often the case that the distance W is set to a value within the range of 100 μm–1 mm.

In the developing device shown in FIG. 4, the developing sleeve 101 is coated with a thin layer of magnetic toner T, as shown in FIG. 6 of the accompanying drawings. The layer thickness of this toner layer is determined by the position of a cut line L shown in FIG. 6.

According to our investigation, it has been found that when the magnetic toner T passes between the developing sleeve 101 and the magnetic blade 202, charges are imparted to the magnetic toner T. Also, it has been found that the behavior of the magnetic toner T during that time is as follows.

As shown in FIG. 5 of the accompanying drawings, supposing planes perpendicular to a straight line linking the developing sleeve 101 and the magnetic blade 202 together, and defining a plane near to the magnetic blade 202 as S1, and a plane near to the developing sleeve 101 as S2, the magnetic flux density on the plane S1 is greater than the magnetic flux density on the plane S2 because generally the width of the magnetic blade 202 is made narrow as compared with the width of the permanent magnet 101b. Accordingly, the magnetic toner T receives a force in the direction indicated by the arrow in FIG. 5, i.e., from the developing sleeve 101 side toward the magnetic blade 202 side, between the developing sleeve 101 and the magnetic blade 202.

Accordingly, as shown in FIG. 6, tip ends of the magnetic toner T forms are shaped like ears of rice (state B) extending from the magnetic blade 202 to the developing sleeve 101. The imparting of charges to the magnetic toner T is done by the developing sleeve 101 and the toner t1 at the tip ends of the toner shaped like ears of rice formed extending from the magnetic blade 202 to the developing sleeve 101 coming into contact with each other to thereby impart charges to the tip ends.

Also, it has been found that the carrying of the toner between the developing sleeve 101 and the magnetic blade 202 is done as follows.

As described above, charges are imparted to the toner t1 at the tip ends of the ears of rice having contacted with the developing sleeve 101 and therefore, by a reflection force, a force acts toward the developing sleeve 101 and by the frictional force with the developing sleeve 101, a carrying force in the direction of rotation of the developing sleeve 101 is exerted.

Also, a certain degree of cohesive force acts between toners and therefore, a carrying force through the intermediary of the cohesive force is also created in the toner t2 which is in contact with the toner t1. A carrying force likewise through the intermediary of the cohesive force is also created in the toner t3 of the upper layer portion.

However, between the developing sleeve 101 and the magnetic blade 202, as described above, a magnetic force from the developing sleeve 101 side to the magnetic blade 202 side is also exerted on the toner. Accordingly, at a place where the carrying force exerted on the toner overcomes the above-mentioned magnetic force, i.e., on the cut line L of FIG. 6, the tip ends of the toner shaped like ears of rice are torn off, and the toner remaining on the developing sleeve 101 is carried in the direction of rotation of the developing sleeve 101.

Accordingly, in a system wherein the degree of cohesion of the magnetic toner is high or a system using a magnetic toner which is high in the frequency of necessary contact for obtaining a necessary triboelectric charge amount, there has been the problem that an insufficiently charged toner not in contact with the developing sleeve is carried to a developing area and a bad image resulting from bad charging is liable to occur.

In order to solve the foregoing problem, we have proposed a developing device which, as shown in FIG. 7 of the accompanying drawings, is provided with a developing sleeve 101 which is a first developer carrying member rotatably disposed in proximity to and opposed relationship with a photosensitive drum 108 which is a latent image bearing member bearing a latent image thereon and carrying a magnetic toner on the surface thereof, a developing sleeve 102' which is a second developer carrying member having an axis parallel with the axis of the developing sleeve 101 and rotatably disposed in proximity to and opposed relationship with the developing sleeve 101 and carrying the magnetic toner on the surface thereof and regulating the magnetic toner on the developing sleeve 101 to a predetermined amount, and developer regulating means 105 for regulating the magnetic toner carried on the surface of the developing sleeve 102' to a predetermined amount, and in which the magnetic toner from the developing sleeve 101 is imparted to the photosensitive drum 108 to thereby visualize the latent image as a toner image, and the developing sleeve 101 and the developing sleeve 102' are rotated in the same direction and have fixedly disposed therein permanent magnets having a plurality of magnetic poles in the circumferential direction thereof.

Such a developing device is designed such that in a developer regulating portion which is a location at which the developing sleeve 101 and the developing sleeve 102' are opposed to each other, at least two carrying forces acting in opposite directions are exerted to the magnetic toner and at least one of the above-mentioned carrying forces is a force which carries the magnetic toner toward a developing area and depends chiefly on the charged amount of the magnetic toner, and the carrying force working in the other direction than toward the developing area is a force depending on a magnetic force exerted on the magnetic toner, and the carrying force toward the developing area is not exerted to the uncharged magnetic toner. As the result, it has become possible to uniformly apply only the sufficiently charged magnetic toner to the surface of the first developer carrying member, and carry only the sufficiently charged magnetic toner to the developing area which is a location at which the photosensitive drum 108 and the developing sleeve 101 are opposed to each other.

However, in the developing device shown in FIG. 7, the amount of toner applied onto the developing sleeve 101 is ⅓ to ½ of that in the developing device shown in FIG. 4.

While in the developing device shown in FIG. 4, the value of (the rotational speed of the developing sleeve 101)/(the rotational speed of the photosensitive drum 108) (hereinafter referred to as the sleeve peripheral speed ratio) is often set to 1.2–1.5, in the developing device shown in FIG. 7, to obtain equal image density, the sleeve peripheral speed ratio must be made higher than in the developing device shown in FIG. 4.

In the developing device shown in FIG. 7, the developing efficiency is higher than in the developing device shown in FIG. 4 and therefore, the toner coat amount in about a half, but the sleeve peripheral speed ratio need not be double (2.5–3) that of the developing device shown in FIG. 4, and at a sleeve peripheral speed ratio of 2–2.5, image density equal to that in the developing device shown in FIG. 4 can be obtained.

In recent years, however, in accordance with the higher speed of the electrophotographic apparatus, the rotational speed of the photosensitive drum has also become higher and therefore, the rotational speed of the developing sleeve has necessarily become higher, and in the developing device shown in FIG. 7, the rotational speed of the developing sleeve must be made higher than in the developing device shown in FIG. 4.

In such a case, when use is made of a toner of a small particle diameter or a toner in which the amount of magnetic material is decreased, it has sometimes been difficult to stabilize the toner coating on the developing sleeve.

In order to solve the problem, there has been proposed a developing device which, as shown in FIG. 8 of the accompanying drawings, is provided with a developing sleeve which is a first developer carrying member rotatably disposed in proximity to and opposed relationship with a photosensitive drum 108 and carrying a magnetic toner thereon a developing sleeve 102 which is a second developer carrying member having an axis parallel with the axis of the developing sleeve 101 and rotatably disposed in proximity to and opposed relationship with the developing sleeve 101 and the photosensitive drum 108 and carrying the magnetic toner on the surface thereof and regulating the magnetic toner on the developing sleeve 101 to a predetermined amount, and developer regulating means 106 for regulating the magnetic toner carried on the surface of the developing sleeve 102 to a predetermined amount, and in which the magnetic toner from the developing sleeve 101 and the developing sleeve 102 is imparted to thereby visualize a latent image on the photosensitive drum 108 as a developer image, and the developing sleeve 101 and the developing sleeve 102 are rotated in the same direction and have fixedly disposed therein permanent magnets having a plurality of magnetic poles in the circumferential direction thereof.

Such a developing device is designed such that in a developer restraining portion which is a location at which the developing sleeve 101 and the developing sleeve 102 are opposed to each other, at least two carrying forces in opposite directions are exerted to the magnetic toner, and at least one of the above-mentioned carrying forces is a force which carries the magnetic toner toward a developing area and depends chiefly on the charged amount of the toner, and the carrying force working in the other direction than toward the developing area is a force depending on a magnetic force exerted on the magnetic toner from the developing sleeve 102, and the developing sleeve 101 and the developing sleeve 102 are disposed in proximity to the photosensitive drum 108.

In such a developing device, the carrying force wording toward the developing area which is a location at which the photosensitive drum 108 and the developing sleeve 101 are opposed to each other is a force depending chiefly on the charged amount of the toner, and the carrying force working in the other direction than toward the developing area is a force depending on the magnetic force exerted on the magnetic toner from the developing sleeve 102, whereby it is possible to carry only the sufficiently charged toner onto the developing sleeve 101.

As described above, any insufficiently charged toner is returned into the developing container 103 by the developing sleeve 102, and the toner coating the developing sleeve 101 is only the sufficiently charged toner.

The developing sleeve 102 is coated with the toner by a member having magnetism or an elastic member. This is a toner regulating method used in a developing device proposed in Japanese Patent Application Laid-Open No. 54-43036. In this method, the insufficiently charged toner also more or less coats the developing sleeve 102.

In the developing device shown in FIG. 8, both of the developing sleeves 101 and 102 are disposed in proximity to the photosensitive drum 108 are designed to effect development.

In the developing device shown in FIG. 8, the procedure of development is such that a latent image on the photosensitive drum 108 is first developed in the developing area by the magnetic toner from the developing sleeve 102. At this time, the toner image on the photosensitive drum 108 by development suffers from the occurrence of image inferiority such as fog or tailing due to the presence of the insufficiently charged toner, and is not sufficient in image density.

Next, the development of the latent image is effected by the magnetic toner from the developing sleeve 101. Here, the toner image formed on the photosensitive drum 108 is reciprocated in the developing area between the photosensitive drum 108 and the developing sleeve 101 by the AC of a developing bias applied onto the developing sleeve 101 and the photosensitive drum 108, and the insufficiently charged toner stripped off from the photosensitive drum 108 during the reciprocation is collected onto the developing sleeve 101 by the magnetic force from the magnetic poles in the developing sleeve 101.

As the result, development is finally effected by the sufficiently charged toner from the developing sleeve 101 and the sufficiently charged toner separated from the insufficiently charged toner from the photosensitive drum 108.

Thereby, it becomes possible to eliminate the image inferiority caused by the insufficiently charged toner and obtain sufficient image density without increasing the rotational speed of the sleeve.

As described above, in the developing device shown in FIG. 8, it has become possible to coat the developing sleeve 101 with only the sufficiently charged toner to thereby eliminate the image inferiority by the insufficiently charged toner caused on the photosensitive drum 108 by the developing sleeve 102.

Even in the developing device as shown in FIG. 8, however, there has been the possibility that depending on the magnetic force and the degree of cohesion or the like of the toner, the insufficiently charged toner moves from the developing sleeve 102 to the developing sleeve 101 and the developing sleeve 101 is coated with the insufficiently charged toner and becomes equal in the charged state to the developing sleeve 102, whereby an image defect by the insufficiently charged toner occurs.

SUMMARY OF THE INVENTION

It is an object of the present invention to provide a developing device in which after the amount of developer on a first developer carrying member is regulated, an insufficiently charged developer is prevented from moving from a second developer carrying member to the first developer carrying member.

It is another object of the present invention to provide a developing device which prevents the occurrence of a bad image by an insufficiently charged developer being present on a first developer carrying member.

It is another object of the present invention to provide a developing device in which magnetic poles in the interior of first and second developer carrying members are provided at such locations that it is difficult for a developer to move from a second developer carrying member to a first developer carrying member.

It is another object of the present invention to provide a developing device which can obtain sufficient image density without increasing the rotational speed of a developer carrying member.

Further objects and features of the present invention will become more apparent from the following detailed description when read with reference to the accompanying drawings.

BRIEF DESCRIPTION OF THE DRAWINGS

FIG. 9 shows the magnetic pole arrangement of a first developer carrying member and a second developer carrying member in the developing device of FIG. 8.

DESCRIPTION OF THE PREFERRED EMBODIMENTS

Some embodiments of the present invention will hereinafter be described with reference to the accompanying drawings.

Figure 1:
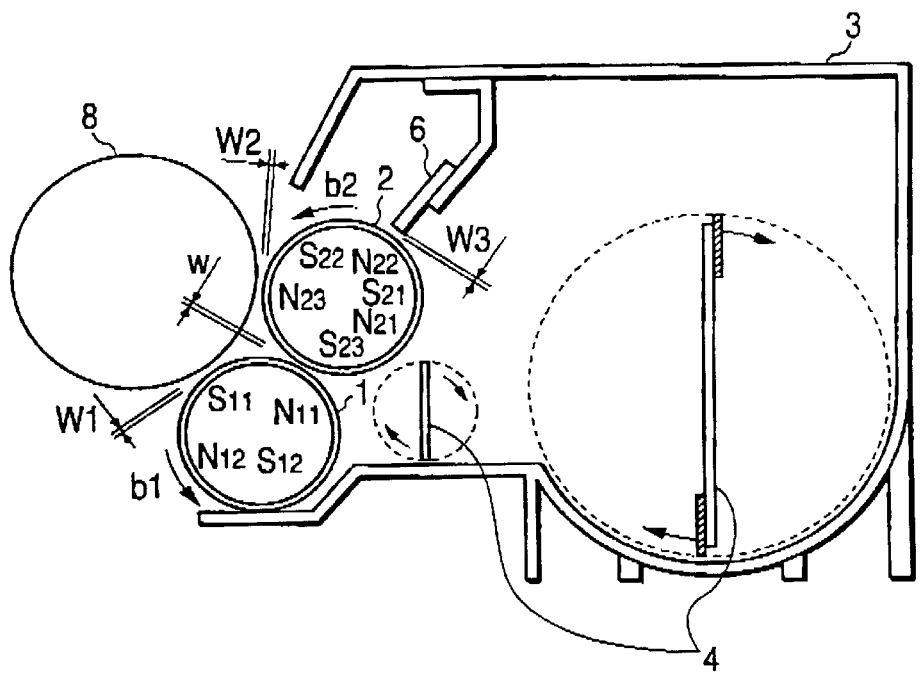
FIG. 1 is a cross-sectional view schematically showing the construction of a developing device according to an embodiment of the present invention.

FIG. 1 is a cross-sectional view schematically showing the construction of a developing device provided in an image forming apparatus which is an embodiment of the present invention.

Such an image forming apparatus is an image forming apparatus in the form which executes along the conventional electrophotographic method a series of image forming process of forming and recording on a sheet-shaped recording medium an image conforming to image information provided from an image information providing apparatus (not shown) such as a host computer provided outside the main body of the image forming apparatus.

The developing device provided in such an image forming apparatus, as shown in FIG. 1, is provided with a developing sleeve 1 which is a first developer carrying member constituted by a nonmagnetic metal member of a diameter 20 mm having fixedly disposed therein a permanent magnet having a plurality of magnetic poles in the circumferential direction thereof and rotated in the direction indicated by the arrow b1, a developing sleeve 2 which is a second developer carrying member constituted by a nonmagnetic metal member of a diameter 20 mm having fixedly disposed therein a permanent magnet having a plurality of magnetic poles in the circumferential direction thereof and rotated in the direction indicated by the arrow b2, a developing container 3 containing therein a magnetic toner which is a developer, a conveying member for conveying the developer in the developing container 3 toward the developing sleeve 1 while agitating the developer, and a developer regulating member 6 which is developer regulating means constituted by a plate-shaped magnetic metal member.

The developing sleeve 2 is disposed in proximity to the developing sleeve 1 for rotation in the direction indicated by the arrow b2 (counter-clockwise direction) which is the same direction as the rotational direction (counter-clockwise direction) b1 of the developing sleeve 1, and is designed such that the distance W of the portion thereof most proximate to the developing sleeve 1 is 300 μm.

The developing sleeve 1 and the developing sleeve 2 are disposed such that the distance W1 of the developing sleeve 1 to a photosensitive drum 8 and the distance W2 of the developing sleeve 2 to the photosensitive drum 8 are 200 μm and 300 μm, respectively. That is, W1<W2.

The developer regulating member 6 is disposed near the magnetic pole N21 of the permanent magnet in the developing sleeve 2 at a distance W3 of 200 μm from the developing sleeve 2.

In the present embodiment, design is made such that the magnetic flux density of the magnetic pole (S21) of the permanent magnet in the developing sleeve 2 disposed in proximity to and opposed relationship with the magnetic pole (N11) of the permanent magnet in the developing sleeve 1 which is at the location whereat the developing sleeve 1 and the developing sleeve 2 are opposed to each other is 800 Gauss and the magnetic flux density of the magnetic pole N11 is 900 Gauss, and the ratio of the width of an area exhibiting a value of 50% or greater to the peak value of the magnetic flux density of each magnetic pole (for the sake of convenience, hereinafter referred to as 50% value) is (50% value of the magnetic pole S21)/(50% value of the magnetic pole N11)≦1.0 (preferably (50% value of the magnetic pole S21)/(50% value of the magnetic pole N11)≦0.8), and (50% value of the magnetic pole S21)/(50% value of the magnetic pole N11)=0.8, whereby the magnetic flux density of a magnetic field formed between the magnetic pole S21 and the magnetic pole N11 becomes higher from the developing sleeve 1 side toward the developing sleeve 2 side.

As the magnetic toner in the present embodiment, use is made of a negatively chargeable toner having a weight mean particle diameter of 5 μm or greater and in which the weight of a magnetic material intra-added into the magnetic toner is 10% or greater of the weight of the magnetic toner.

In the developing container 3 constructed as shown in FIG. 1, the carrying force toward the developing area of the developing sleeve 1 is exerted in the following manner.

The magnetic toner in the developing container 3 is carried toward the developing sleeve 1 by the agitating member 4, and is held on the developing sleeve 1 by the permanent magnet in the developing sleeve 1. At that time, the magnetic toner present near the surface of the developing sleeve 1 is charged by the friction thereof with the surface of the developing sleeve 1, and the thus charged magnetic toner is held on the surface of the developing sleeve 1 by the reflection force by the charges of the toner itself, and this sufficiently charged magnetic toner obtains a carrying force to the developing area with the rotation of the developing sleeve 1 by the reflection force depending on the charged amount and the frictional force of the surface of the developing sleeve 1.

Also, a carrying force in a direction opposite to the direction toward the developing area is exerted in the following manner.

At the position whereat the developing sleeve 1 and the developing sleeve 2 are opposed to each other, the magnetic flux density is higher from the developing sleeve 1 side toward the developing sleeve 2 side and therefore, a magnetic force from the developing sleeve 1 side toward the developing sleeve 2 side acts on the magnetic toner present between the developing sleeve 1 and the developing sleeve 2. Also, the developing sleeve 2 is designed to be rotated in the direction indicated by the arrow b2 which is the same direction as the direction of rotation of the developing sleeve 1 and therefore, the magnetic force and the frictional force with the surface of the developing sleeve 2 exerts a carrying force from the developing sleeve 2 toward the interior of the developing container 3 to the magnetic toner held on the surface of the developing sleeve 2 by a magnetic force.

Figure 6:
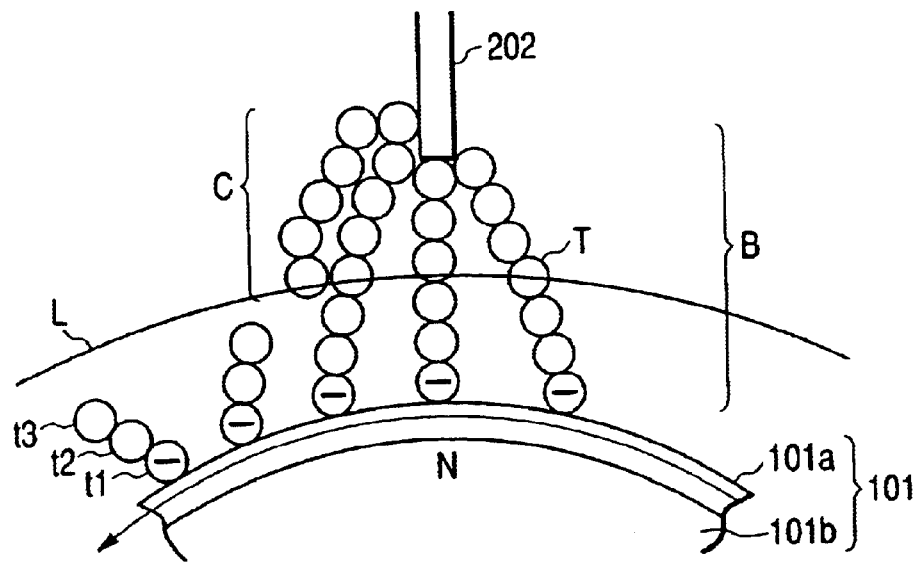
FIG. 6 is a view for illustrating the behavior of a developer in the developer amount regulating portion by the developer regulating means in the developing device of FIG. 4.
Figure 7:
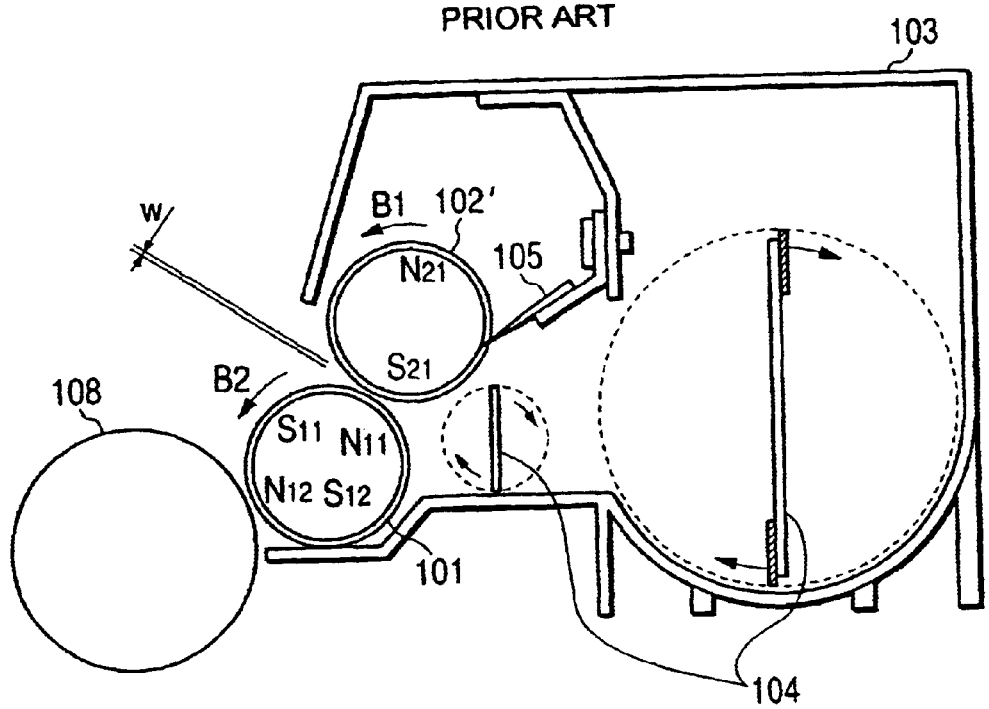
FIG. 7 is a cross-sectional view schematically showing the construction of a developing device according to the conventional art.
Figure 8:
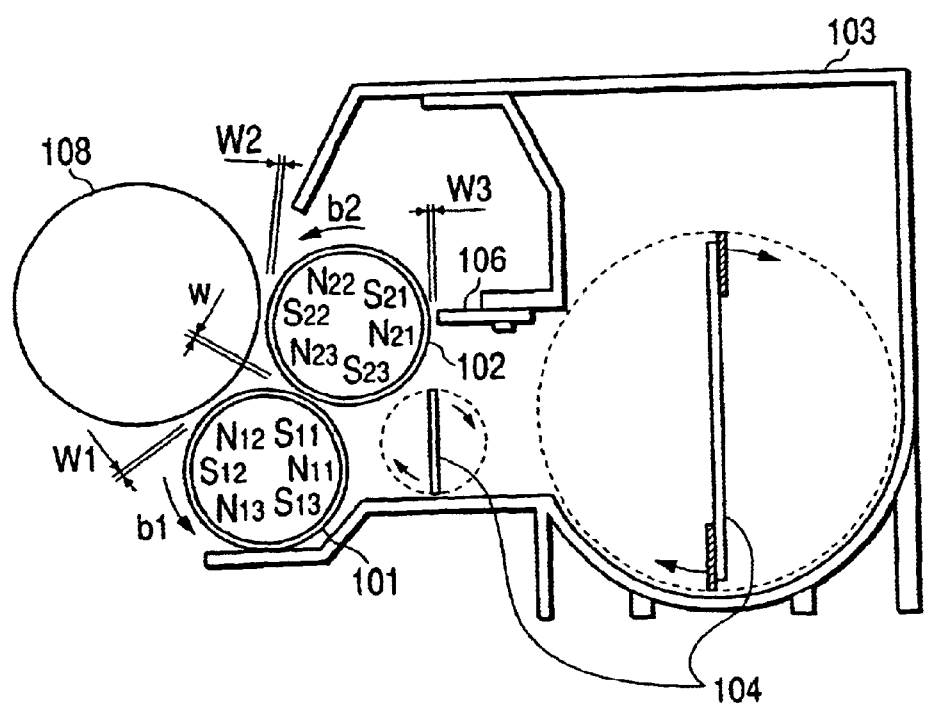
FIG. 8 is a cross-sectional view schematically showing the construction of a developing device according to the conventional art.

The toner carried by the surface of the developing sleeve 2 forms a toner chain by the developer regulating member 6, as shown in FIG. 6, and is applied onto the developing sleeve 2.

In the conventional system, as shown in FIG. 9, with the toner carrying property of the developing sleeves 1 and 2 taken into account, the magnetic poles thereof are brought close to one another and therefore, there has arisen the problem that a magnetic pole S11 and a magnetic pole N23 are present in an area A and by the magnetic line of force between these two poles, the insufficiently charged toner is moved to the developing sleeve 1 with the aid of the magnetic force from N23 toward S11.

Figure 2:
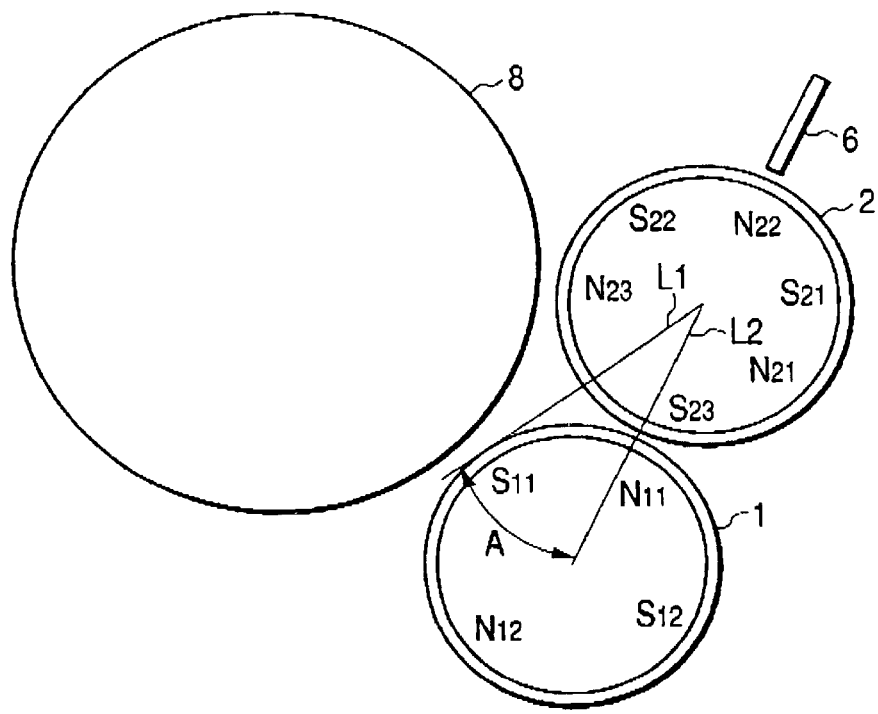
FIG. 2 shows the magnetic pole arrangement of a first developer carrying member and a second developer carrying member in the developing device of FIG. 1.

In order to solve the problem, the arrangement of the magnetic poles of the developing sleeves 1 and 2 used in the present embodiment is such as shown in FIG. 2. That is, the developing sleeve 1 is designed such that no magnetic pole is disposed at the circumferential position at the position whereat the developing sleeve 1 and the developing sleeve 2 are opposed to each other in an area (an area A in FIG. 2) formed between the tangent L1 of the latent image bearing member side from the center of rotation of the developing sleeve 2 toward the surface of the developing sleeve 1 and a line L2 linking the center of rotation of the developing sleeve 1 and the center of rotation of the developing sleeve 2 together.

Here, the positions of the plurality of magnetic poles of the developing sleeve 1 and the plurality of magnetic poles of the developing sleeve 2 are set so that magnetic poles S11 and S12 of a predetermined polarity (S pole) among the plurality of magnetic poles of the developing sleeve 1 and magnetic poles N21, N22 and N23 of the opposite polarity (N pole) to the predetermined polarity among the plurality of magnetic poles of the developing sleeve S2 may not exist at a time at the position whereat the developing sleeve 1 and the developing sleeve 2 are opposed to each other in the area A formed between the tangent L1 of the photosensitive drum 8 side from the center of rotation of the developing sleeve 2 toward the surface of the developing sleeve 1 and the line L2 linking the center of rotation of the developing sleeve 1 and the center of rotation of the developing sleeve 2 together.

Among the magnetic poles of the predetermined polarity of the developing sleeve 1 and the magnetic poles of the opposite polarity of the developing sleeve 2, one may be at the opposed position in the area A. For example, when the magnetic pole S11 is at the opposed position in the area A, the magnetic poles N21, N22 and N23 are set so as not to exit at the opposed position in the area A. It is desirable to set the positions of the magnetic poles so that there may not exist a magnetic line of force from the surface of the developing sleeve 2 to the surface of the developing sleeve 1.

Thus, the toner coating the developing sleeve 2 between the magnetic poles N23 and S23 of the developing sleeve 2 does not stand in shapes like ears of rice as a toner chain, and does not move from the developing sleeve 2 to the developing sleeve 1.

As the result, the insufficiently charged toner does not coat the developing sleeve 1, and the toner carried to the developing area is only the sufficiently charged toner. Thus, the developing sleeves 1 and 2 have their surfaces coated with the toner, and both of them can effect development on the photosensitive drum 8.

In case of development, as described above, development is first effected from the developing sleeve 2, and then development is effected from the developing sleeve 1.

By this step, the insufficiently charged toner present on the developing sleeve 2 used for the development of the photosensitive drum 8 is collected by the developing sleeve 1, whereby it becomes possible to prevent bad images due to the insufficiently charged toner, and the amount of toner contributing to development is supplied from the two sleeves, whereby it becomes possible to obtain sufficient image density even if the rotational speed of the developing sleeves is made 1.5 times as high as the rotational speed of the photosensitive member.

Figure 3:
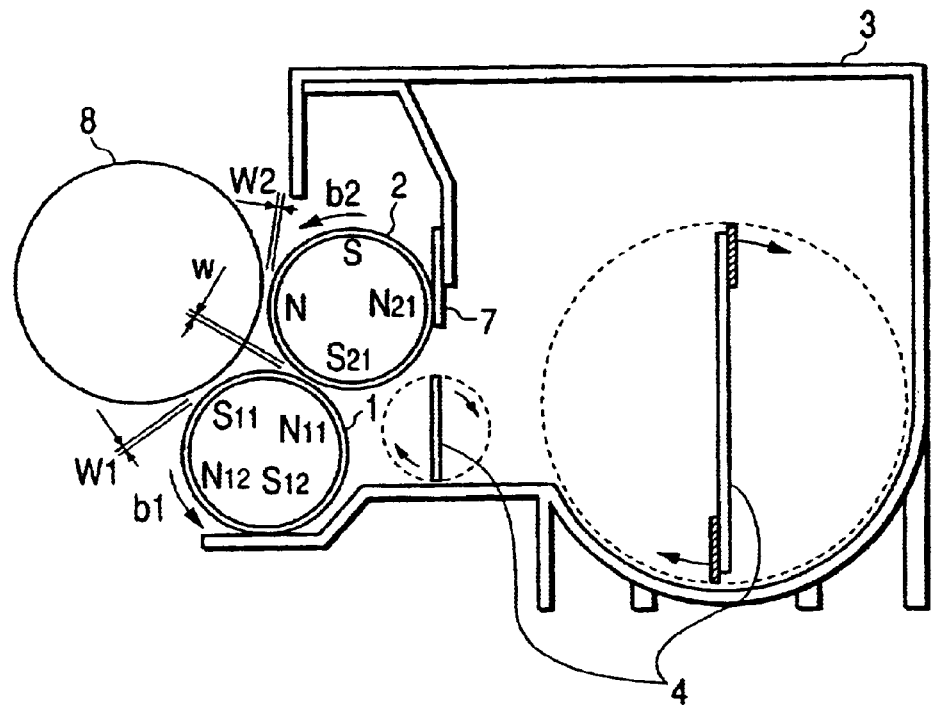
FIG. 3 is a cross-sectional view schematically showing the construction of a developing device according to another embodiment of the present invention.
Figure 4:
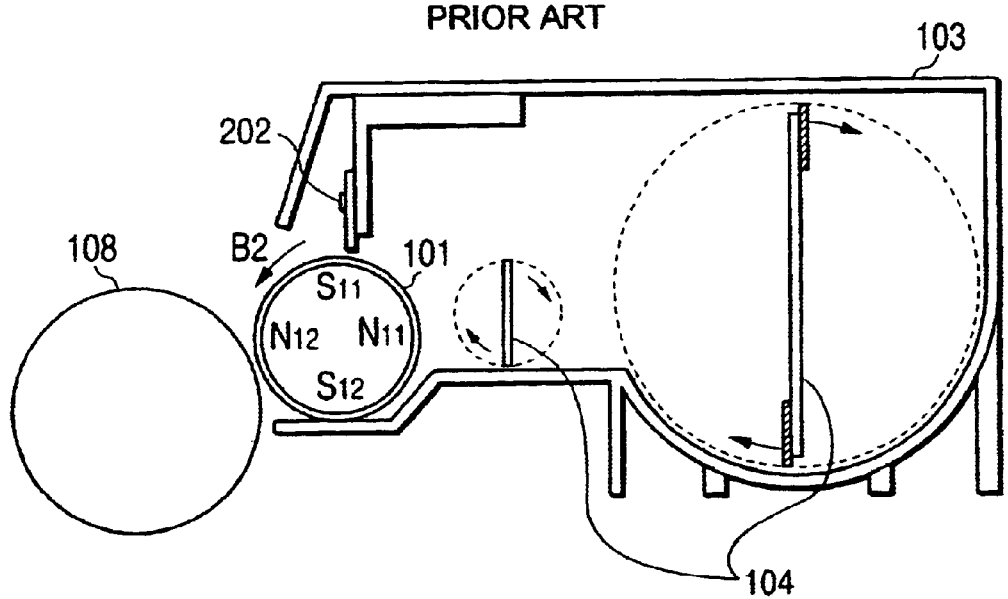
FIG. 4 is a cross-sectional view schematically showing the construction of a developing device according to the conventional art.
Figure 5:
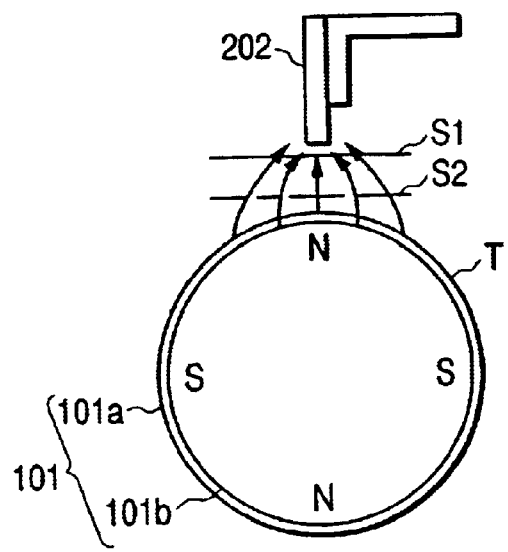
FIG. 5 is a view for illustrating the magnetic flux density in a developer amount regulating portion by developer regulating means in the developing device of FIG. 4.

While in the present embodiment, the toner coating the developing sleeve 2 is regulated by the use of a magnetic blade, a similar effect can also be obtained by the contact regulation by an elastic member 7 as shown in FIG. 3.

Also, while in the present embodiment, design is made such that no magnetic pole is disposed in the area A, design may also be made such that two magnetic poles of the same polarity are disposed at the opposite position in the area A so that a magnetic line of force from the surface of the developing sleeve 2 to the surface of the developing sleeve 1 may not be produced in the area A. For example, the N pole of the developing sleeve 1 and the N pole of the developing sleeve 2 may be provided at the opposite position in the area A.

As described above, according to the present invention, there can be prevented the occurrence of bad images due to the insufficiently charged developer moving from the second developer carrying member to the first developer carrying member after the amount of developer on the first developer carrying member has been regulated to a predetermined amount.

What is claimed is:

1. A developing device comprising:
   a rotatable first developer carrying member for carrying a developer thereon to develop an electrostatic image formed on an image bearing member with the developer, said first developer carrying member being provided with a plurality of nonrotary magnetic poles therein;
   a rotatable second developer carrying member for carrying the developer thereon to develop said electrostatic image formed on said image bearing member with the developer, said second developer carrying member being disposed upstream of said first developer carrying member in a direction of movement of said image bearing member, said second developer carrying member being provided with a regulation surface for regulating an amount of the developer carried on said first developer carrying member, and said second developer carrying member being provided with a plurality of nonrotary magnetic poles therein, a direction of rotation of said second developer carrying member being the same direction as a direction of rotation of said first developer carrying member; and a developer regulating member for regulating an amount of the developer carried on said second developer carrying member, wherein positions of said plurality of magnetic poles within said first developer carrying member and said plurality of magnetic poles within said second developer carrying member are set so that a magnetic line of force from a surface of said second developer carrying member to a surface of said first developer carrying member may not exist at an opposite position whereat said first developer carrying member and said second developer carrying member are opposed to each other in an area formed between a tangent connecting a center of rotation of said second developer carrying member to the surface of said first developer carrying member on a side of said image bearing member and a line connecting a center of rotation of said first developer carrying member to the center of rotation of said second developer carrying member.

2. A developing device according to claim 1, wherein the positions of said plurality of magnetic poles within said first developer carrying member and said plurality within magnetic poles of said second developer carrying member are set so that a magnetic pole of a predetermined polarity among said plurality of magnetic poles within said first developer carrying member and a magnetic pole of an opposite polarity to said predetermined polarity among said plurality of magnetic poles within said second developer carrying member may not exist at a time at said opposite position.

3. A developing device according to claim 2, wherein said predetermined polarity is an N pole.

4. A developing device according to claim 1, wherein said developer includes magnetic toner.

5. A developing device according to claim 4, wherein a gap between said first developer carrying member and said second developer carrying member is smaller than a gap between said first developer carrying member and said image bearing member.

6. A developing device according to claim 1 or 2, wherein one of said plurality of magnetic poles within said first developer carrying member and one of said plurality of magnetic poles within said second developer carrying member are opposite in polarity to each other, and is provided in a vicinity of said area so as to be opposed to each other.

7. A developing device according to claim 1, wherein said developing device is used in an image forming apparatus for forming an image on a recording medium.

8. A developing device according to claim 1, wherein said plurality of magnetic poles within said first developer carrying member includes a first magnetic pole and a second magnetic pole of an opposite polarity to said first magnetic pole, and said opposite position is interposed between said first magnetic pole and said second magnetic pole.

9. A developing device according to claim 1, wherein said plurality of magnetic poles within said second developer carrying member includes a first magnetic pole and a second magnetic pole of an opposite polarity to said first magnetic pole, and said opposite position is interposed between said first magnetic pole and said second magnetic pole.

10. A developing device according to claim 1, wherein the direction of rotation of said first developer carrying member and the direction of rotation of said second developer carrying member are opposite to a direction of rotation of said image bearing member.

11. A developing device according to claim 1, wherein a center of rotation of said first developer carrying member is disposed below a center of rotation of said second developer carrying member.

12. A developing device comprising:

a rotatable first developer carrying member for carrying a developer thereon to develop an electrostatic image formed on an image bearing member with the developer, said first developer carrying member being provided with a plurality of nonrotary magnetic poles therein;

a rotatable second developer carrying member for carrying the developer thereon to develop said electrostatic image formed on said image bearing member with the developer, said second developer carrying member being provided upstream of said first developer carrying member in a direction of movement of said image bearing member, said second developer carrying member being provided with a regulation surface for regulating an amount of the developer carried on said first developer carrying member, and said developer carrying member being provided with a plurality of nonrotary magnetic poles therein, a direction of rotation of said second developer carrying member being the same direction as a direction of rotation of said first developer carrying member; and a developer regulating member for regulating an amount of the developer carried on said second developer carrying member, wherein positions of said plurality of magnetic poles within said first developer carrying member and said plurality of magnetic poles within said second developer carrying member are set so that a magnetic pole of a predetermined polarity among said plurality of magnetic poles within said first developer carrying member and a magnetic pole of an opposite polarity to said predetermined polarity among said plurality of magnetic poles within said second developer carrying member may not exist at a time at an opposite position whereat said first developer carrying member and said second developer carrying member are opposed to each other in an area formed between a tangent connecting a center of rotation of said second developer carrying member to a surface of said first developer carrying member on a side of said image bearing member and a line connecting a center of rotation of said first developer carrying member and the center of rotation of said second developer carrying member.

13. A developing device according to claim 12, wherein said predetermined polarity is an N pole.

14. A developing device according to claim 12, wherein said developer includes magnetic toner.

15. A developing device according to claim 14, wherein a gap between said first developer carrying member and said second developer carrying member is smaller than a gap between said first developer carrying member and said image bearing member.

16. A developing device according to claim 12, wherein one of said plurality of magnetic poles within said first developer carrying member and one of said plurality of magnetic poles within said second developer carrying member are opposite in polarity to each other, and is provided in a vicinity of said area so as to be opposed to each other.

17. A developing device according to claim 12, wherein said developing device is used in an image forming apparatus for forming an image on a recording medium.

18. A developing device according to claim 12, wherein said plurality of magnetic poles within said first developer carrying member includes a first magnetic pole and a second magnetic pole of an opposite polarity to said first magnetic pole, and said opposite position is interposed between said first magnetic pole and said second magnetic pole.

19. A developing device according to claim 12, wherein said plurality of magnetic poles within said second developer carrying member includes a first magnetic pole and a second magnetic pole of an opposite polarity to said first magnetic pole, and said opposite direction is interposed between said first magnetic pole and said second magnetic pole.

20. A developing device according to claim 12, wherein the direction of rotation of said first developer carrying member and the direction of rotation of said second developer carrying member are opposite to a direction of rotation of said image bearing member.

21. A developing device according to claim 12, wherein a center of rotation of said first developer carrying member is disposed below a center of rotation of said second developer carrying member.

* * * * *